(12) United States Patent
Ryu et al.

(10) Patent No.: US 9,466,095 B2
(45) Date of Patent: Oct. 11, 2016

(54) IMAGE STABILIZING METHOD AND APPARATUS

(71) Applicant: HANWHA TECHWIN CO., LTD., Changwon-Si (KR)

(72) Inventors: Yeongeol Ryu, Changwon-si (KR); Sangji Park, Changwon-si (KR); Hwalsuk Lee, Changwon-si (KR); Shimin Yin, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 94 days.

(21) Appl. No.: 14/601,467

(22) Filed: Jan. 21, 2015

(65) Prior Publication Data

US 2015/0206290 A1 Jul. 23, 2015

(30) Foreign Application Priority Data

Jan. 21, 2014 (KR) ........................ 10-2014-0007467

(51) Int. Cl.
*G06T 5/00* (2006.01)
*G06T 7/20* (2006.01)

(52) U.S. Cl.
CPC ............ *G06T 5/003* (2013.01); *G06T 7/2033* (2013.01); *G06T 2207/10016* (2013.01); *G06T 2207/20016* (2013.01); *G06T 2207/20144* (2013.01); *G06T 2207/20182* (2013.01); *G06T 2207/20201* (2013.01); *G06T 2207/30196* (2013.01); *G06T 2207/30232* (2013.01)

(58) Field of Classification Search
USPC ........................... 382/255; 348/208.99–208.6
See application file for complete search history.

(56) References Cited

U.S. PATENT DOCUMENTS

| | | | | |
|---|---|---|---|---|
| 7,010,045 B2* | 3/2006 | Lee | ................... | H04N 5/23248 348/E5.046 |
| 7,956,898 B2 | 6/2011 | Chen et al. | | |
| 8,325,810 B2* | 12/2012 | Vella | ..................... | G06T 7/2006 348/208.99 |
| 8,787,656 B2 | 7/2014 | Park et al. | | |
| 8,797,414 B2* | 8/2014 | Park | ....................... | H04N 5/145 348/208.3 |
| 8,988,536 B2* | 3/2015 | Park | ....................... | H04N 5/145 348/208.6 |
| 9,055,223 B2* | 6/2015 | Slutsky | .................. | G06T 5/003 |
| 9,232,140 B2* | 1/2016 | Saitwal | ............. | H04N 5/23267 |
| 2013/0129144 A1 | 5/2013 | Chang et al. | | |
| 2013/0307937 A1* | 11/2013 | Kim | .................. | H04N 5/23264 348/47 |

FOREIGN PATENT DOCUMENTS

| | | |
|---|---|---|
| JP | 2011-3057 A | 1/2011 |
| KR | 10-2012-0105764 A | 9/2012 |
| KR | 10-2013-0057283 A | 5/2013 |

\* cited by examiner

*Primary Examiner* — Ishrat I Sherali
(74) *Attorney, Agent, or Firm* — Sughrue Mion, PLLC

(57) ABSTRACT

Provided are an image stabilizing method and apparatus, which are capable of performing robust operations in a moving environment. The image stabilizing apparatus includes: an image pre-processor configured to receive a current image and a reference image corresponding to the current image; a feature point selector configured to select at least one feature point corresponding to a background from a plurality of feature points, comprising the background and at least one moving object, in the reference image; a motion estimator configured to estimate a motion of a current image, based on the selected feature point in the reference image and at least one corresponding feature point, corresponding to the selected feature point in the reference image, in the current image; and an image corrector configured to generate a stabilized current image by converting the current image by using the estimated motion.

20 Claims, 8 Drawing Sheets

(1 of 8 Drawing Sheet(s) Filed in Color)

REFERENCE IMAGE

REDUCED IMAGE

EDGE IMAGE

FEATURE POINT

REFERENCE IMAGE

STABILIZED IMAGE CURRENT

MOVING OBJECT — BACKGROUND

FOREGROUND IMAGE

REFERENCE IMAGE ON WHICH
FEATURE POINTS ARE DISPLAYED

REMOVAL OF FEATURE POINTS
ON MOVING OBJECT

NEXT IMAGE

☐ : FEATURE POINTS EXTRACTED ON BACKGROUND
☐ : FEATURE POINTS EXTRACTED ON MOVING OBJECT

IMAGE STABILIZING METHOD AND APPARATUS

CROSS-REFERENCE TO THE RELATED APPLICATION

This application claims priority from Korean Patent Application No. 10-2014-0007467, filed on Jan. 21, 2014, in the Korean Intellectual Property Office, the disclosure of which is incorporated herein in its entirety by reference.

BACKGROUND

1. Field

Methods and apparatuses consistent with exemplary embodiments relate to image stabilizing capable of performing robust operations in a moving environment.

2. Description of the Related Art

Recently, as the use of multimedia devices has increased, image quality enhancement technologies for digital images captured in various environments have also increased. Such image quality enhancement technologies may include image blurring removal technologies and image stabilization technologies, and may be widely applied to digital cameras, smartphones, household cameras, camcorders, industrial surveillance cameras, broadcasting cameras, military imaging devices, and the like. An existing imaging device forms an image by digitizing analog image data. However, a recent imaging device adopts various pre-processing and post-processing correction technologies to obtain a cleaner and clearer digital image than an existing analog image.

SUMMARY

Exemplary embodiments of the inventive concept include an image stabilizing method and apparatus, which are capable of robust operations even in a mobile environment by removing feature points corresponding to a moving object by using a foreground image.

Various aspects of the inventive concept will be set forth in part in the description which follows and, in part, will be apparent from the description, or may be learned by practice of the presented embodiments.

According to one or more exemplary embodiments, there is provided an image stabilizing apparatus which may include: an image pre-processor configured to receive a current image and a reference image corresponding to the current image; a feature point selector configured to select at least one feature point corresponding to a background from a plurality of feature points, comprising the background and at least one moving object, in the reference image; a motion estimator configured to estimate a motion of a current image, based on the selected feature point in the reference image and at least one corresponding feature point, corresponding to the selected feature point in the reference image, in the current image; and an image corrector configured to generate a stabilized current image by converting the current image by using the estimated motion.

The apparatus may further include a foreground generator configured to generate a foreground image of the current image from a difference image between the current image and the reference image, and synchronize the foreground image with a next image. Here, the feature point selector may be configured to select the feature point in the reference image by removing at least one feature point, corresponding to a moving object in the synchronized foreground image, from among the feature points in the reference image.

The foreground generator may be configured to synchronize the foreground image with the next image by delaying the foreground image by one frame.

The apparatus may further include: a first feature point extractor configured to extract the feature point of the reference image; and a second feature point extractor configured to track the selected feature point of the reference image in the current image and extract the corresponding feature point of the current image.

The image preprocessor nay be configured to convert the current image and the reference image into gray images and resize the gray images before the extraction of the feature point of the reference image, and the feature point extractor may be configured to extract the feature point of the reference image using the resized gray images.

The foreground generator may be further configured to generate a foreground image of a next image from a difference image between the stabilized current image and a next reference image.

The feature point selector may be further configured to remove at least one feature point, corresponding to at least one moving object in the foreground image of the next image, from among a plurality of feature points, comprising the at least one moving object and a background, in the next reference image, select at least one feature point corresponding to the background in the next reference image, and detect at least one corresponding point in the next image by tracking the selected feature point in the next reference image. The motion estimator may be further configured to estimate a motion of the next image based on the detected corresponding point in the next image, and the image corrector may be further configured to generate a stabilized next image by converting the next image by using the estimated motion.

According to one or more exemplary embodiments, there is provided an image stabilizing method which may include: receiving a current image and a reference image corresponding to the current image; selecting at least one feature point corresponding to a background from a plurality of feature points, comprising the background and at least one moving object, in the reference image; estimating a motion of the current image based on the selected feature point in the reference image and at least one corresponding feature point, corresponding to the selected feature point in the reference image, in the current image; and generating a stabilized current image by converting the current image by using the estimated motion.

The method may further include: generating a foreground image of the current image from a difference image between the current image and the reference image; and synchronizing the foreground image with a next image, wherein the selecting at least one feature point in the reference image is performed by removing at least one feature point, corresponding to at least one moving object in the synchronized foreground image, from among the feature points in the reference image.

The synchronizing the foreground image with the next image may be performed by delaying the foreground image by one frame.

The generating the foreground image may include: converting the current image and the reference image into gray images and resizing the gray images; and generating the foreground image based on a difference image between the resized images.

The generating the foreground image may include removing noise by applying blob filtering to the difference image.

The g method may further include: extracting the feature point of the reference image; and tracking the selected feature point of the reference image in the current image and extracting the corresponding feature point of the current image.

The image stabilizing method may further include, before extracting the feature point of the reference image: converting the reference image and the current image into gray images; and resizing the gray images. Thus, the feature point of the reference image may be extracted using the resized gray images.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
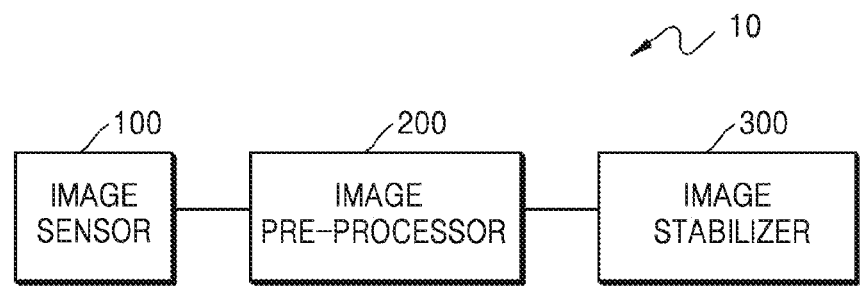
FIG. 1 is a block diagram illustrating a configuration of an image stabilizing apparatus according to an exemplary embodiment.

Reference will now be made in detail to exemplary embodiments which are illustrated in the accompanying drawings. In this regard, the present embodiments may have different forms and should not be construed as being limited to the descriptions set forth herein. Accordingly, the exemplary embodiments are merely described below, by referring to the figures, to explain aspects of the inventive concept.

It will be understood that the inventive concept is not limited to the present exemplary embodiments and includes all modifications, equivalents and substitutions falling within the spirit and scope of the inventive concept. In the following description, detailed descriptions of well-known functions or configurations will be omitted since they would unnecessarily obscure the object matters of the embodiments.

The terms used in the present specification are merely used to describe particular embodiments, and are not intended to limit the inventive concept. As used herein, the singular forms "a", "an", and "the" are intended to include the plural forms as well, unless the context clearly indicates otherwise. It will be understood that the terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof. It will be understood that although the terms "first", "second", etc. may be used herein to describe various components, these components should not be limited by these terms. These components are only used to distinguish one component from another.

Hereinafter, exemplary embodiments will be described with reference to the accompanying drawings. Like reference numerals denote like elements throughout the specification and drawings, and redundant descriptions thereof will be omitted.

A shake occurs when a user captures an image while holding an imaging device, or when a user captures an image while moving. In the case of a camera installed in means of transportation, such as a vehicle, an airplane, or a helicopter, an unwanted shake occurs due to several environmental factors, such as a mechanical vibration or a friction with the ground. In addition, as a magnification of a zoom lens increases, an image shake becomes severer even in a slight movement. An image stabilization technology is designed to obtain a clean and clear image even when an imaging device shakes during capturing and remove an unwanted shake (movement) occurring in the captured image.

In a case where an image is stabilized using a motion of a background image, an image motion is calculated using feature points extracted from the background image. However, in a case where feature points extracted from a moving object are used to calculate an image motion, an error may occur to an extent that cannot ignore the calculation of the image motion, causing a failure in image stabilization.

In an image stabilization according to an exemplary embodiment, a stabilized image is generated by extracting feature points from a reference image, detecting corresponding feature points from a current image by using a feature point tracking, calculating a motion between the reference image and the current image, based on a pair of corresponding feature points, and converting the current image based on the calculated motion. At this time, a foreground image is generated using the reference image and the stabilized current image. The generated foreground image is delayed by one frame and is output in synchronization with a next image. Thus, the foreground image is used to stabilize the next image. In the feature points of the reference image used for tracking the corresponding feature points of the current image, the feature points existing on the moving object are removed and only the feature points existing on the background are used. Therefore, an image shake (motion) may be corrected more accurately.

FIG. 1 is a block diagram illustrating a configuration of an image stabilizing apparatus 10 according to an exemplary embodiment.

Referring to FIG. 1, the image stabilizing apparatus 10 may include an image sensor 100, an image pre-processor 200, and an image stabilizer 300.

The image sensor 100 refers to a camera that captures an image of an object by using a complementary metal-oxide semiconductor (CMOS) module or a charge coupled device (CCD) module. An image (or a moving image) input with respect to an object is provided to the CMOS module or the CCD module through a lens, and the CMOS module or the CCD module converts an optical signal of the image of the object passing through the lens into an electrical signal (capturing signal). Furthermore, the image sensor 100 may be a thermal camera. The thermal camera refers to a camera that forms an image by detecting a temperature difference between an object and a background around the object by using radiant energy from each object, and converting the detected temperature difference into an electrical signal.

The image pre-processor 200 may improve image quality by performing image signal processing on the image signal output from the image sensor 100, such as noise reduction, gamma correction, color filter array interpolation, color matrix, color correction, and color enhancement. In addition, the image pre-processor 200 may compress image data generated by the image signal processing into an image file, or may reconstruct the original image data from the image file. An image compression format may be reversible or irreversible. Furthermore, the image pre-processor 200 may function to perform chromatic processing, blurring processing, edge enhancement processing, image interpretation processing, image recognition processing, image effect processing, and the like. The image recognition processing may include face recognition processing and scene recognition processing. For example, the image pre-processor 200 may perform brightness level adjustment processing, color correction processing, contrast adjustment processing, edge enhancement processing, screen segmentation processing, character image generation processing, and image synthesis processing.

In addition, the image pre-processor 200 may convert a reference image and a current image, which are color images, into gray scale images (gray images) and resize the gray images to generate resized images. According to an exemplary embodiment, a calculation amount and a calculation time may be reduced by estimating an image motion by using the resized image instead of the original image.

The image stabilizer 300 may generate a foreground image or a foreground map by using a difference image between the reference image and a stabilized image. The image stabilizer 300 may remove feature points on a foreground (moving object) from among feature points extracted in advance from the reference image, and select only feature points on the background. The image stabilizer 300 may extract corresponding feature points from the current image by performing the feature point tracking on the current image, and calculate a local motion vector between the reference image and the current image by using the corresponding feature points between the reference image and the current image. The image stabilizer 300 may generate a stabilized image by converting the current image based on a motion of the current image.

In the present embodiment (FIG. 1), the image pre-processor 200 and the image stabilizer 300 are illustrated as separate components. However, according to another exemplary embodiment, the image pre-processor 200 may be configured to be included in the image stabilizer 300.

Figure 2:
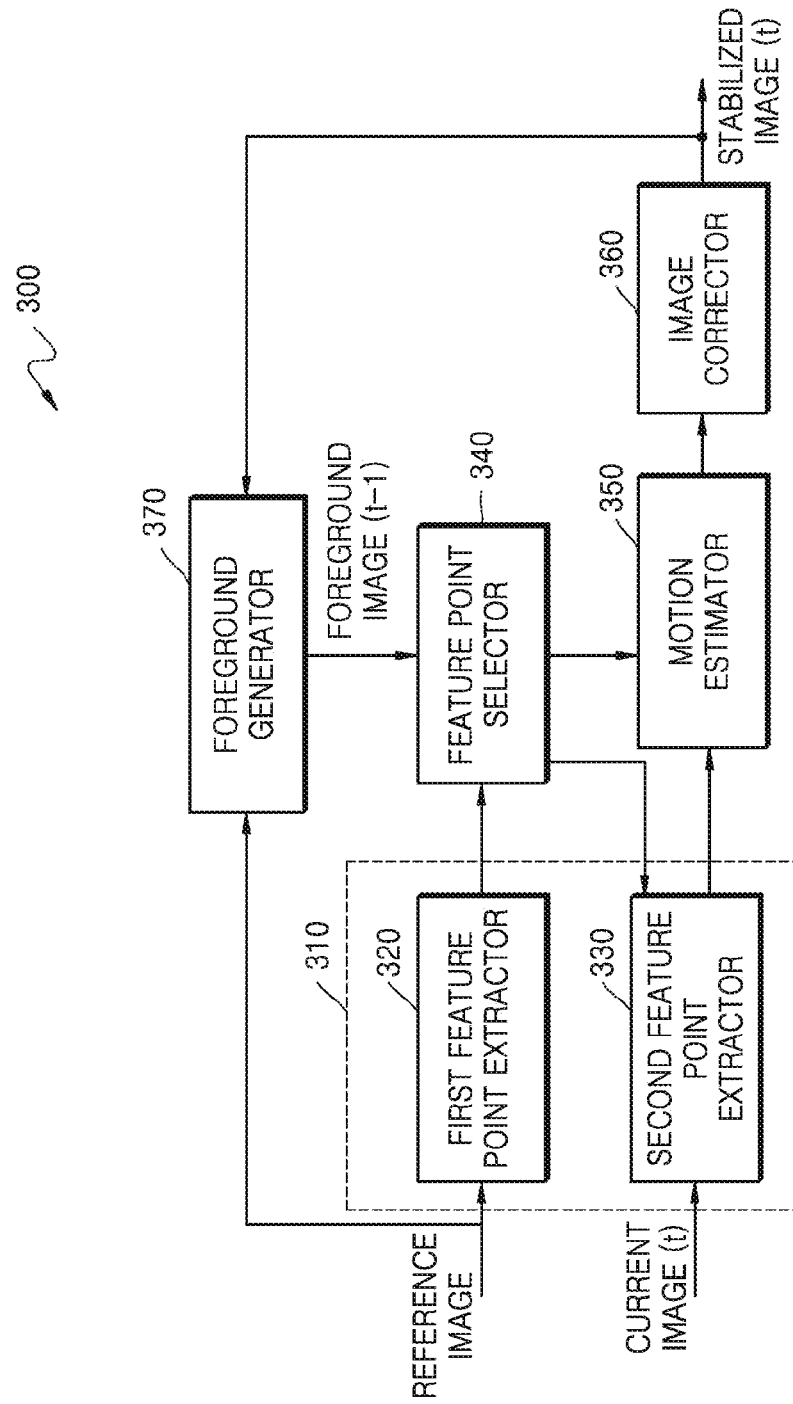
FIG. 2 is a schematic block diagram of an image stabilizer according to an exemplary embodiment.

FIG. 2 is a schematic block diagram of the image stabilizer 300 according to an exemplary embodiment.

Referring to FIG. 2, the image stabilizer 300 may include a feature point extractor 310, a feature point selector 340, a motion estimator 350, an image corrector 360, and a foreground generator 370.

The feature point extractor 310 may detect feature points from the current image and the reference image processed by the image pre-processor 200. The reference image refers to an image having the least shake from among images included in image data generated by capturing an object, and the image having the least shake may be set as the reference image.

The feature point extractor 310 may include a first feature point extractor 320 that extracts feature points from the reference image, and a second feature point extractor 330 that extracts feature points from the current image. These feature points may be represented by coordinates. The image may include various feature elements. If necessary, some of the various feature elements may be extracted as the feature points.

The first feature point extractor 320 may extract the feature points based on edge information of the reference image. The detection of the feature points from the image may be performed using a Harris corner detection method, a scale invariant feature transform (SIFT) algorithm, a speeded up robust feature (SURF) algorithm, or the like.

The second feature point extractor 330 may extract the corresponding feature points of the current image by tracking the selected feature points from the current image from among the extracted feature points of the reference image input from the feature point selector 340 to be described below. The extraction of the corresponding feature points may be said to find where the feature points selected from the reference image are located in the current image. The tracking of the feature points may be performed using various feature point tracking algorithms, such as a kanade-lucas-tomasi (KLT) tracker algorithm, a taylor expansion, or a hessian matrix.

FIGS. 5A to 5D are diagrams for explaining the extraction of feature points according to an exemplary embodiment.

Figure 5A:
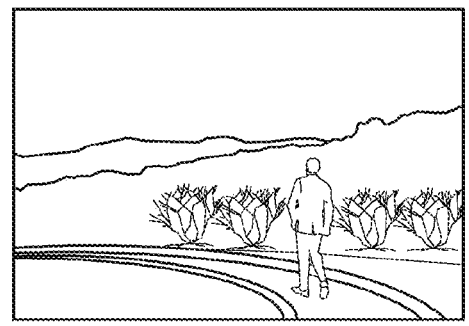
FIGS. 5A to 5D are diagrams for explaining a feature point extraction according to an exemplary embodiment.
Figure 5B:
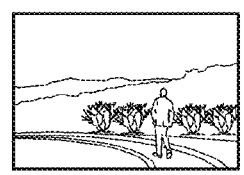
Figure 5C:
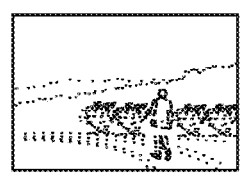
Figure 5D:
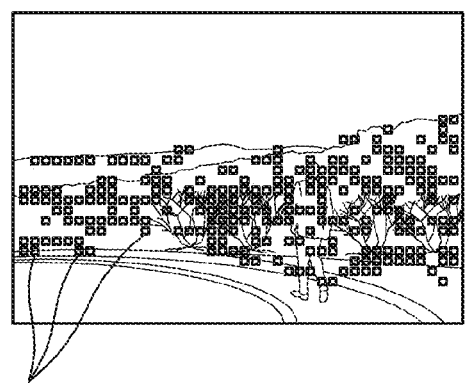

FIGS. 5A, 5B, and 5C illustrate a reference image, a reduced image, and an edge image of the reduced image, respectively. In a case where the number of edges existing in an arbitrary block (for example, a 3×3 block) of an edge image exceeds a threshold value, the feature point extractor 310 may extract the block as feature point. In order to remove feature points existing on an edge that is highly likely to fail in the tracking of the feature points and select feature points at which edges are crossed or located at corners, the threshold value may be changed by adjusting the width and length of the block. FIG. 5D illustrates feature points extracted when the number of edges existing in the block of the edge image exceeds the threshold value. The feature point extraction of FIGS. 5A to 5D is merely exemplary, and the exemplary embodiment is not limited thereto. The feature points may be extracted using various methods.

Figure 6A:
FIGS. 6A to 6F are diagrams for explaining image stabilization using an arbitrary image according to an exemplary embodiment.
Figure 6B:
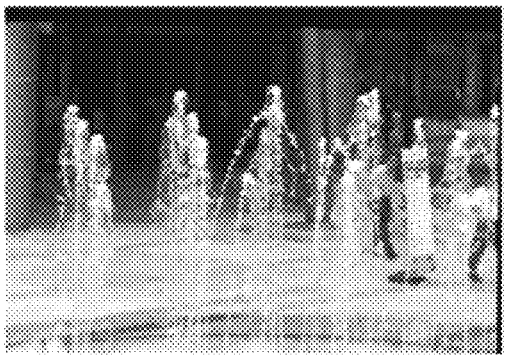
Figure 6C:
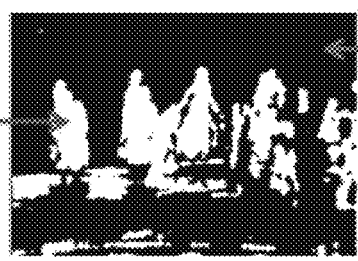

The foreground generator 370 may generate the foreground image from the difference image between the reference image and the stabilized current image. The foreground image may be a binary image that represents the background and the moving object. The foreground generator 370 may convert the reference image and the stabilized current image into gray images, reduces the gray images by resizing, and generates the foreground image, including the background and the moving object, from the difference image of the resized reference image and the resized current stabilized image. FIGS. 6A, 6B, and 6C illustrate an arbitrary reference image, an arbitrary stabilized current image, and a foreground image that is a difference image between the reference image and the stabilized current image, the foreground image including a background and a moving object, respectively. Noise may be removed by applying a blob filter, such as a median filter, to the difference image. The reason why the difference image is obtained using the reference image and the stabilized current image is as follows. First, if a stabilized image is successfully obtained, the reference image and the stabilized current image are aligned with each other. Therefore, the difference image represents a moving object in theory. Second, an existing background modeling technique may be used, but a processing speed thereof is slow. Thus, in the present exemplary embodiment, the difference image between the reference image and the stabilized current image is used considering high-speed processing.

A calculation amount may be reduced by setting an image reduction ratio of the foreground generator 370 to be larger than an image reduction ratio of the image pre-processor 200. The foreground image generated from the stabilized current image and the reference image may be delayed by one frame and be output in synchronization with a next image. Thus, the foreground image is used to stabilize the next image.

Figure 6D:
Figure 6E:

The feature point selector 340 may remove extracted feature points corresponding to the moving object of the foreground image from the feature points of the reference image, and select the extracted feature points corresponding to the background. FIG. 6D illustrates a reference image including feature points, and FIG. 6E illustrates a screen on which feature points corresponding to a moving body of a foreground image are removed from the reference image and feature points corresponding to the background of the foreground image are selected from the reference image. The feature point selector 340 may remove feature points corresponding to the moving object of the foreground image from the feature points of the reference image, and select the feature points corresponding to the background.

Figure 6F:
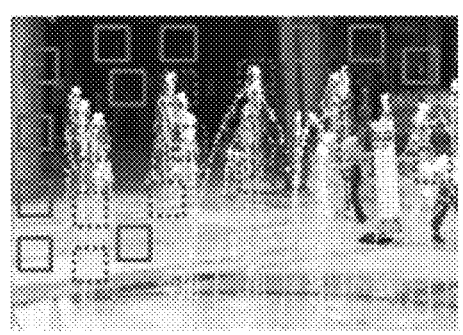

The motion estimator 350 may detect corresponding points between the selected feature points of the reference image and the corresponding feature points of the current image, and calculate a motion between the reference image and the current image by using the detected corresponding points. FIG. 6E illustrates the reference image including the selected feature points, and FIG. 6F illustrates a next image including the corresponding feature points. The motion estimator 350 may use the detected corresponding points to estimate a motion indicating how much the current image is moved as compared to the reference image.

The image corrector 170 may generate the stabilized image by converting the current image by using the estimated motion.

Figure 3:
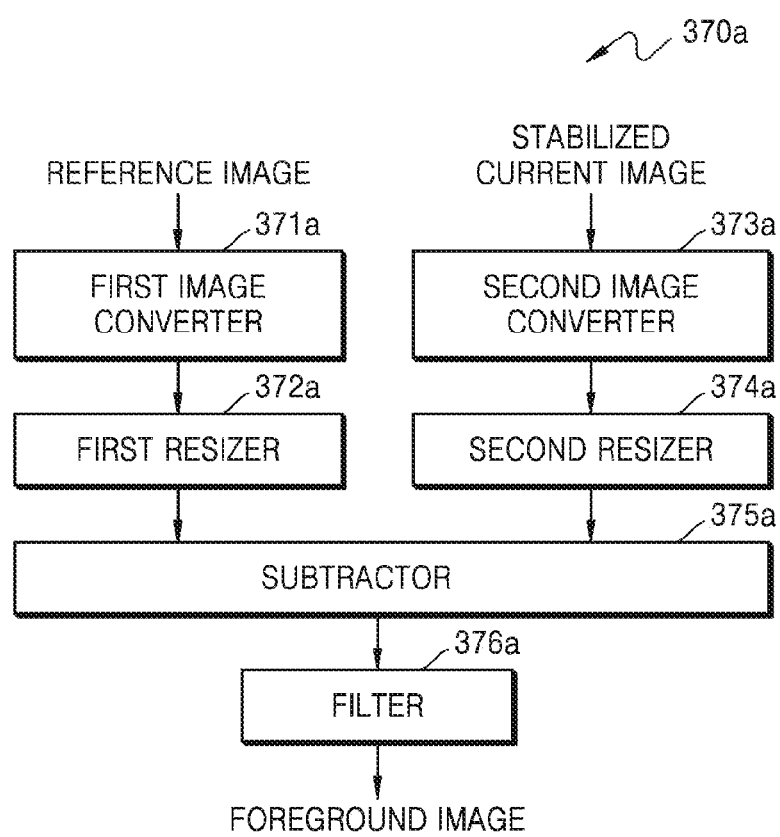
FIGS. 3 and 4 are schematic block diagrams of foreground generation units according to exemplary embodiments.
Figure 4:
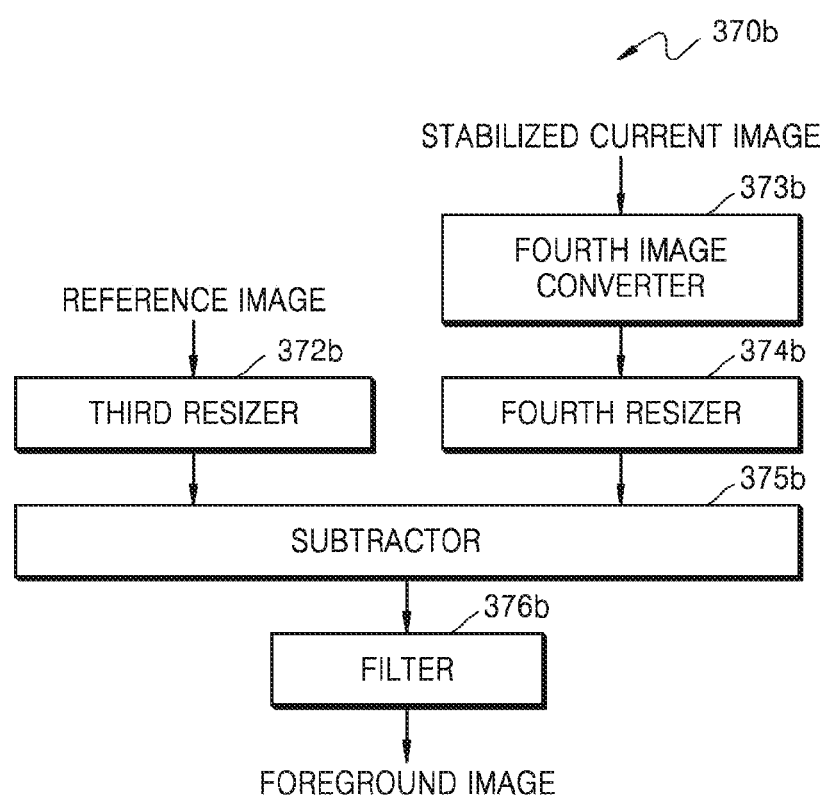

FIGS. 3 and 4 are schematic block diagrams of the foreground generation units according to exemplary embodiments.

Referring to FIG. 3, a foreground generator 370a may include a first image converter 371a that converts the reference image into a reference gray image, a first resizer 372a that generates a reduced image by reducing a size of the reference gray image, a second image converter 373a that converts the stabilized current image into a current gray image, a second resizer 374a that generates a reduced image by reducing a size of the current gray image, a subtractor 375a that generates a difference image by subtracting the two reduced images, and a filter 376b that removes noise by applying a blob filter to the difference image. The foreground image generated using the stabilized current image is delayed by one frame and is used to stabilize a next image.

Referring to FIG. 4, the foreground generator 370b may include a third resizer 372b, a fourth image converter 373b, a fourth resizer 374b, a subtractor 375b, and a filter 376b. The third resizer 372b may receive the reference image converted into the reference gray image by the image pre-processor 200 and generate a reduced image, or may receive the reference image reduced after the conversion into the reference gray image by the image pre-processor 200 and generate an additionally reduced image. The fourth image converter 373b may convert the stabilized current image into the current gray image, and the fourth resizer 374b may generate the reduced image by reducing the size of the current gray image. The subtractor 375b may generate the difference image by subtracting the two reduced images, and the filter 376b may remove noise by applying a blob filter to the difference image. The foreground image generated using the stabilized current image is delayed by one frame and is used to stabilize a next image. The exemplary embodiment of FIG. 4 may reduce a calculation amount by using the previously converted reference image as compared to the exemplary embodiment of FIG. 3.

Figure 7:
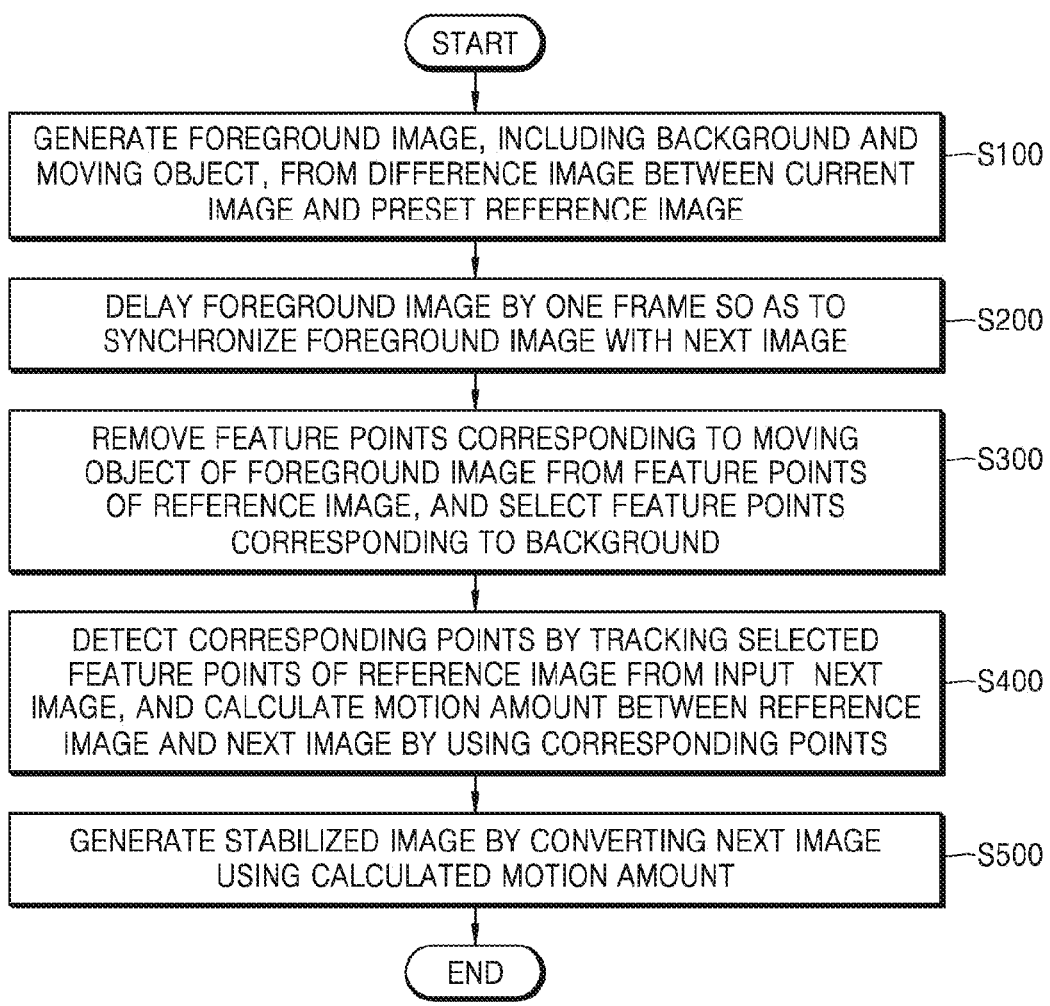
FIG. 7 is a flowchart of an image stabilizing method according to an exemplary embodiment.

FIG. 7 is a flowchart of an image stabilizing method according to an exemplary embodiment. The image stabilizing method according to the exemplary embodiment may be performed by the image stabilizing apparatus in cooperation with peripheral components as illustrated in FIG. 1. In the following description, portions redundant with the description about FIGS. 1 to 6 will be omitted.

In operation S100, the image stabilizing apparatus may generate a foreground image, including a background and a moving object, from a difference image between a reference image and a current image. Here, the current image may be an image which is stabilized in a previous processing. The image stabilizing apparatus may convert the reference image and the current image into a reference gray image and a current gray image, respectively, resize the reference gray image and the current gray image, and generate a foreground image, which includes the background and the moving object, from the difference image. The reason why the difference image is obtained using the reference image and the stabilized current image is as follows. First, if a stabilized image is successfully obtained, the reference image and the stabilized current image are aligned with each other. Therefore, the difference image represents a moving object in theory. Second, an existing background modeling technique may be used, but a processing speed thereof is slow. Thus, in the present exemplary embodiment, the difference image between the reference image and the stabilized current image is used considering high-speed processing.

In operation S200, when the foreground image is generated, the image stabilizing apparatus delays the foreground image by one frame so as to synchronize the foreground image with a next image.

In operation S300, the image stabilizing apparatus may remove feature points corresponding to the moving object in the foreground image, which is delayed by one frame, from feature points of the reference image, and select feature points corresponding to the background.

In operation S400, the image stabilizing apparatus may detect corresponding points by tracking the selected feature points of the reference image from the next image input thereto, and calculate a motion between the reference image and the next image by using the detected corresponding points. The detection of the corresponding points may be said to find where the feature points selected from the reference image are located in the next image. When the corresponding points are detected, the image stabilizing apparatus may use the corresponding points to calculate a motion amount indicating how much the next image is moved as compared to the reference image.

In operation S500, the image stabilizing apparatus may generate a stabilized image by converting the next image by using the calculated motion amount. This stabilized image may be a stabilized current image to be used when a next stabilized image is generated.

Figure 8:
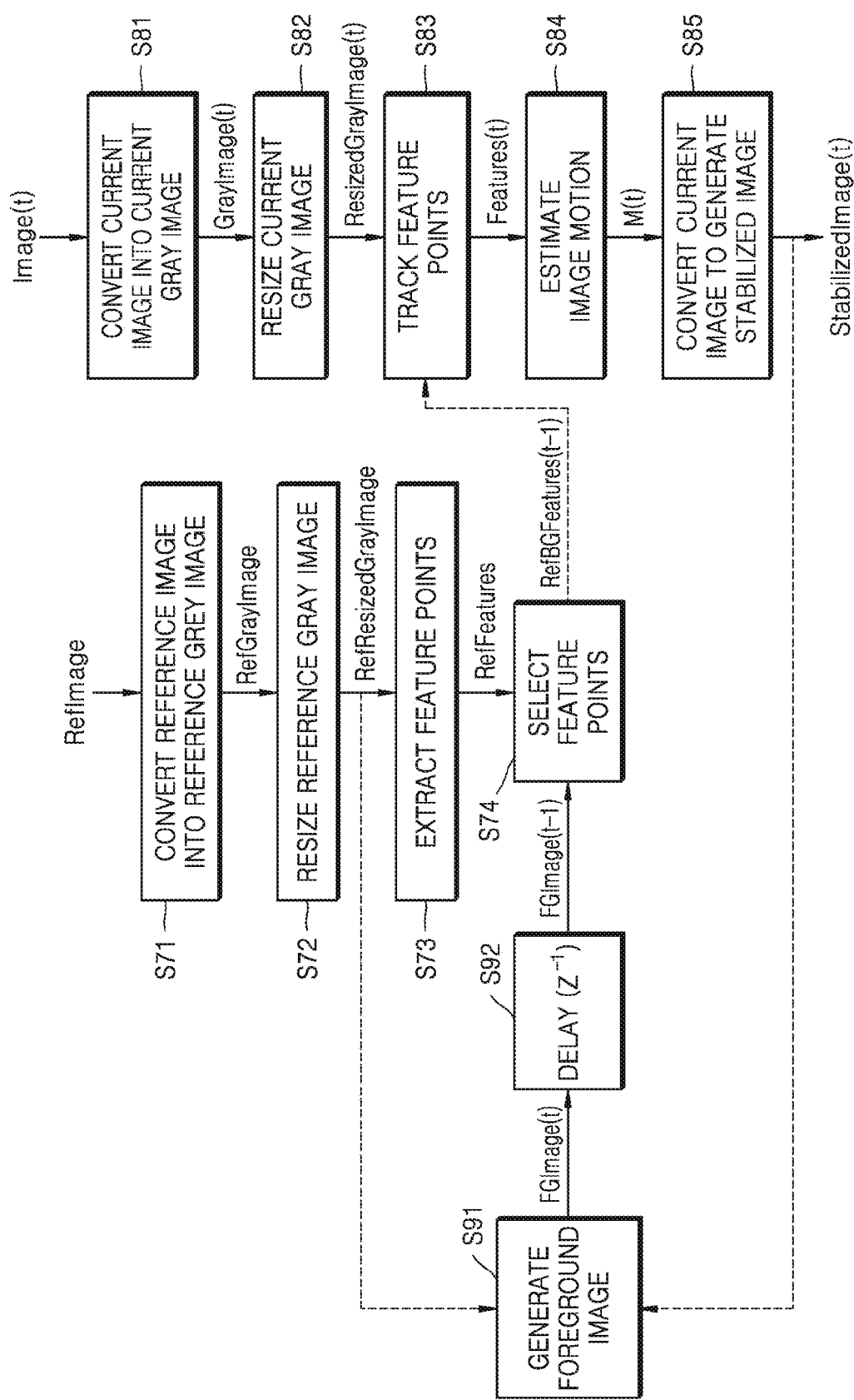
FIG. 8 is a flowchart of an image stabilizing method according to an exemplary embodiment.

FIG. 8 is a flowchart of an image stabilizing method according to an exemplary embodiment.

In operation S71, the image stabilizing apparatus may generate a reference gray image RefGrayImage by converting a reference image RefImage into a gray image. In operation S72, the image stabilizing apparatus may generate a reference resized gray image RefResizedGrayImage by resizing the reference gray image RefGrayImage. In operation S81, the image stabilizing apparatus may generate a current gray image GrayImage(t) by converting a current image Image(t) into a current gray image GrayImage(t). In operation S82, the image stabilizing apparatus may generate a current resized gray image ResizedGrayImage(t) by resizing the current gray image GrayImage(t).

In operation S73, the image stabilizing apparatus may extract feature points RefFeatures from the reference resized gray image RefResizedGrayImage. In operation S74, the image stabilizing apparatus may remove feature points corresponding to the moving object and select background feature points RefBGFeatures(t−1) corresponding to the background.

In operation S83, the image stabilizing apparatus may extract feature points Features(t) from the current resized gray image ResizedGrayImage(t) by tracking the background feature points RefBGFeatures(t−1) selected from the reference image.

In operation S84, the image stabilizing apparatus may estimate a motion M(t) of the current image from the background feature points RefBGFeatures(t−1) of the reference resized gray image RefResizedGrayImage and the corresponding feature points Features(t) of the current resized gray image ResizedGrayImage(t).

In operation S85, the image stabilizing apparatus may generate a stabilized current image StabilizedImage(t) by converting the current image Image(t) through warping, based on the motion M(t) of the current image.

A foreground image FGImage(t) is generated from a difference image between the stabilized current image StabilizedImage(t) and the reference image RefImage. And the foreground image FGImage(t) may be delayed by one frame ($Z^{-1}$) and be output as a foreground image FGImage(t−1) used to stabilize a next image. The image stabilizing apparatus may store the foreground image generated from the stabilized current image in a separate frame memory or the like and be output in synchronization with an input of the next image. Here, to stabilize the next image, another reference image or the same reference image RefImage may be used.

An existing image stabilization technology fails to stabilize an image when a moving object occupies a large portion of the image. However, as described above, the image stabilization technology according to the above exemplary embodiments is capable of stabilizing an image even when a moving object occupies a large portion of an image. For example, the above exemplary embodiments may be used for image stabilization in an environment in which a moving object occupies a large portion of an image as in the case of a person or a vehicle.

In addition, since a method of generating a foreground image according to the related art uses a background modeling technique having a large amount of calculation, a processing speed thereof is slow. However, the image stabilization technique according to the above exemplary embodiments uses a difference image between a reference image and a stabilized current image, a foreground image may be quickly generated. The foreground image may be applied to other image analysis algorithms.

Furthermore, the image stabilization technology according to the above exemplary embodiments may be used for image alignment in a fixed camera, a mobile camera, or a PTZ camera, and may be used for motion detection, object tracking, object detection, and object recognition.

Moreover, the image stabilization technology according to the above exemplary embodiments may robustly detect the corresponding points of two images in a moving environment.

The use of the term "the" or a similar definite term in the specification (in particular, in the claims) may correspond to both the singular and the plural. In addition, when a range is disclosed in the exemplary embodiments, exemplary embodiments to which individual values belonging to the range are applied may be included (if there is no disclosure opposite to this), and this is the same as that each of the individual values forming the range is disclosed in the detailed description of the exemplary embodiments.

For steps forming the methods according to the inventive concept, if an order is not clearly disclosed or if there is no disclosure opposed to the clear order, the steps may be performed in a proper order. The inventive concept is not necessarily limited to the disclosed order of the steps. The use of all illustrations or illustrative terms (for example, and the like, etc.) in the exemplary embodiments is simply to describe the inventive concept in detail, and the scope of the inventive concept is not limited due to the illustrations or illustrative terms unless they are limited by claims. In addition, it will be understood by those of ordinary skill in the art that various modifications, combinations, and changes may be made according to design conditions and factors within the scope of the attached claims or the equivalents.

The image pre-processor 200 and the image stabilizer 300 illustrated in FIG. 1, and at least one of the components, elements or units represented by a block as illustrated in FIGS. 2-4 to constitute the image stabilizer 300 may be embodied as various numbers of hardware, software and/or firmware structures that execute respective functions described above, according to an exemplary embodiment. For example, the image pre-processor 200, the image stabilizer 300 and at least one of the components, elements or units of FIGS. 2-4 may use a direct circuit structure, such as a memory, processing, logic, a look-up table, etc. that may execute the respective functions through controls of one or more microprocessors or other control apparatuses. Also, the image pre-processor 200, the image stabilizer 300 and at least one of the components, elements or units of FIGS. 2-4 may be specifically embodied by a module, a program, or a part of code, which contains one or more executable instructions for performing specified logic functions. Also, the image pre-processor 200, the image stabilizer 300 and at least one of the components, elements or units of FIGS. 2-4 may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each embodiment should typically be considered as available for other similar features or aspects in other embodiments.

While various exemplary embodiments have been described with reference to the figures, it will be understood by those of ordinary skill in the art that various changes in form and details may be made therein without departing from the spirit and scope of the inventive concept as defined by the following claims.

What is claimed is:

1. An image stabilizing apparatus comprising:
   an image pre-processor configured to receive a current image and a reference image corresponding to the current image;
   a feature point selector configured to select at least one feature point corresponding to a background from a plurality of feature points, comprising the background and at least one moving object, in the reference image;
   a motion estimator configured to estimate a motion of a current image, based on the selected feature point in the reference image and at least one corresponding feature point, corresponding to the selected feature point in the reference image, in the current image; and
   an image corrector configured to generate a stabilized current image by converting the current image by using the estimated motion.

2. The apparatus of claim 1, further comprising a foreground generator configured to generate a foreground image of the current image from a difference image between the current image and the reference image, and synchronize the foreground image with a next image,
   wherein the feature point selector is configured to select the feature point in the reference image by removing at least one feature point, corresponding to a moving object in the synchronized foreground image, from among the feature points in the reference image.

3. The apparatus of claim 2, wherein the foreground generator is configured to synchronize the foreground image with the next image by delaying the foreground image by one frame.

4. The apparatus of claim 2, wherein the image pre-processor is configured to convert the current image and the reference image into gray images, and resize the gray images, and
   wherein the foreground generator is configured to generate the foreground image based on a difference image between the resized images.

5. The image stabilizing apparatus of claim 4, wherein the foreground generation is configured to remove noise by applying a blob filter to the difference image.

6. The apparatus of claim 1, further comprising:
   a first feature point extractor configured to extract the feature point of the reference image; and
   a second feature point extractor configured to track the selected feature point of the reference image in the current image and extract the corresponding feature point of the current image.

7. The apparatus of claim 6, wherein the image preprocessor is configured to convert the current image and the reference image into gray images and resize the gray images before the extraction of the feature point of the reference image, and
   wherein the feature point extractor is configured to extract the feature point of the reference image using the resized gray images.

8. The apparatus of claim 1, further comprising a foreground generator configured to generate a foreground image of a next image from a difference image between the stabilized current image and a next reference image.

9. The apparatus of claim 8, wherein the next reference image is the same as the reference image.

10. The apparatus of claim 8, wherein the feature point selector is configured to remove at least one feature point, corresponding to at least one moving object in the foreground image of the next image, from among a plurality of feature points, comprising the at least one moving object and a background, in the next reference image, select at least one feature point corresponding to the background in the next reference image, and detect at least one corresponding point in the next image by tracking the selected feature point in the next reference image,
    wherein the motion estimator is configured to estimate a motion of the next image based on the detected corresponding point in the next image, and
    wherein the image corrector is configured to generate a stabilized next image by converting the next image by using the estimated motion.

11. An image stabilizing method comprising:
    receiving a current image and a reference image corresponding to the current image;
    selecting at least one feature point corresponding to a background from a plurality of feature points, comprising the background and at least one moving object, in the reference image;
    estimating a motion of the current image based on the selected feature point in the reference image and at least one corresponding feature point, corresponding to the selected feature point in the reference image, in the current image; and
    generating a stabilized current image by converting the current image by using the estimated motion.

12. The method of claim 11, further comprising
    generating a foreground image of the current image from a difference image between the current image and the reference image; and
    synchronizing the foreground image with a next image;
    wherein the selecting at least one feature point in the reference image is performed by removing at least one feature point, corresponding to at least one moving object in the synchronized foreground image, from among the feature points in the reference image.

13. The method of claim 12, wherein the synchronizing the foreground image with the next image is performed by delaying the foreground image by one frame.

14. The method of claim 12, wherein the generating the foreground image comprises:
    converting the current image and the reference image into gray images and resizing the gray images; and
    generating the foreground image based on a difference image between the resized images.

15. The method of claim 14, wherein the generating the foreground image comprises removing noise by applying blob filtering to the difference image.

16. The method of claim 11, further comprising:
    extracting the feature point of the reference image; and
    tracking the selected feature point of the reference image in the current image and extracting the corresponding feature point of the current image.

17. The method of claim 16, further comprising, before extracting the feature point of the reference image:
    converting the reference image and the current image into gray images; and
    resizing the gray images, wherein the feature point of the reference image is extracted using the resized gray images.

18. The method of claim 11, further comprising generating a foreground image of a next image from a difference image between the stabilized current image and a next reference image.

19. The method of claim 18, wherein the next reference image is the same as the reference image.

20. The method of claim 18, further comprising:
removing at least one feature point corresponding to at least one moving object in the foreground image of the next image from among a plurality of feature points, comprising the at least one moving object and a background, in the next reference image;
selecting at least one feature point corresponding to the background in the next reference image;
detecting at least one corresponding point in the next image by tracking the selected feature point in the next reference image;
estimating a motion of the next image based on the detected corresponding point in the next image; and
generating a stabilized next image by converting the next image by using the estimated motion.

* * * * *